United States Patent
Stieber et al.

(10) Patent No.: US 9,812,878 B1
(45) Date of Patent: Nov. 7, 2017

(54) DYNAMIC CURRENT REDISTRIBUTION FOR PORTABLE ELECTRONIC DEVICES

(71) Applicant: Amazon Technologies, Inc., Seattle, WA (US)

(72) Inventors: Marcel Colman Eric Stieber, Sunnyvale, CA (US); Thomas Gang Wang, San Jose, CA (US); Vidhyananth Ramasamy Venkatasamy, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/968,325

(22) Filed: Dec. 14, 2015

Related U.S. Application Data

(63) Continuation-in-part of application No. 14/744,782, filed on Jun. 19, 2015.

(51) Int. Cl.
  *G06F 1/26* (2006.01)
  *H02J 7/00* (2006.01)

(52) U.S. Cl.
  CPC ............ *H02J 7/0021* (2013.01); *H02J 7/007* (2013.01); *H02J 7/0052* (2013.01)

(58) Field of Classification Search
  CPC ......... H02J 7/007; H02J 7/0021; H02J 7/0052
  USPC ............................................... 713/321
  See application file for complete search history.

(56) References Cited

U.S. PATENT DOCUMENTS

| | | | | |
|---|---|---|---|---|
| 5,963,015 A * | 10/1999 | Lee | ........................ | H02J 7/0068 320/128 |
| 6,005,368 A * | 12/1999 | Frame | ................... | G06F 1/1632 307/53 |
| 6,167,289 A * | 12/2000 | Ball | ...................... | H02J 7/0073 455/572 |
| 7,952,328 B2 * | 5/2011 | Parker | .................... | G06F 1/263 320/112 |
| 2006/0103353 A1 * | 5/2006 | Kim | ......................... | G06F 1/26 320/128 |
| 2007/0279004 A1 * | 12/2007 | Wang | .................... | H02J 7/0019 320/128 |
| 2008/0122290 A1 * | 5/2008 | Li | ........................... | G06F 1/263 307/31 |
| 2008/0258688 A1 * | 10/2008 | Hussain | ................... | H02J 7/06 320/145 |
| 2009/0033283 A1 * | 2/2009 | Beg | ........................ | H02J 9/062 320/128 |
| 2010/0134072 A1 * | 6/2010 | Neu | ....................... | G06F 1/1632 320/137 |
| 2013/0179719 A1 * | 7/2013 | Tseng | ..................... | G06F 1/263 713/340 |

(Continued)

*Primary Examiner* — Vincent Tran
(74) *Attorney, Agent, or Firm* — Eversheds Sutherland (US) LLP

(57) ABSTRACT

Systems, methods, and computer-readable media are disclosed for dynamic current redistribution. Example methods may include determining that a power source is in communication with a first battery, determining that a second battery is in communication with the first battery, and charging the first battery at a first charging current value. Example methods may include charging the second battery at a second charging current value, determining that an input voltage from the power source is equal to or greater than a voltage threshold, and charging the second battery at a third charging current value that is higher than the second charging current value.

20 Claims, 13 Drawing Sheets

(56) References Cited

U.S. PATENT DOCUMENTS

2013/0328520 A1* 12/2013 Chen .................... H02J 7/0052
320/107
2015/0194821 A1* 7/2015 Yoshimoto ............. H02J 7/022
320/107

* cited by examiner

DYNAMIC CURRENT REDISTRIBUTION FOR PORTABLE ELECTRONIC DEVICES

CROSS REFERENCE TO RELATED APPLICATIONS

This application is a continuation-in-part of application Ser. No. 14/744,782, filed Jun. 19, 2015.

BACKGROUND

Users may consume digital content, such as music, movies, images, electronic books (e-books), and so forth on electronic devices. Among these electronic devices are e-book readers, smartphones, tablets, phablets, personal digital assistants (PDAs), portable media players, laptops, netbooks, and the like. Electronic devices may have batteries with limited capacity that may need to be charged frequently. Because electronic devices may be portable, external batteries may be used to charge the batteries of electronic devices when an outlet charger is not available or convenient. Charging both the battery of the electronic device and an external battery may be time consuming.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
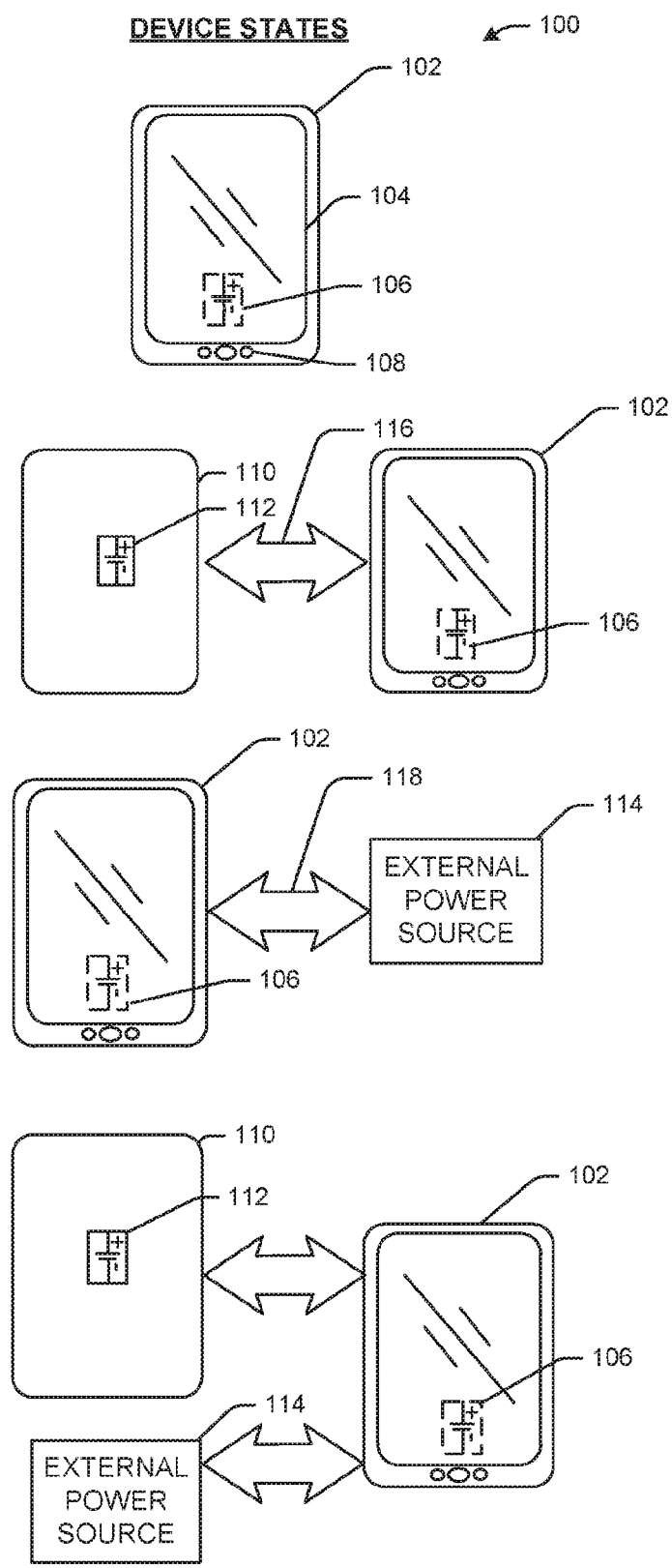
FIG. 1 is a schematic diagram illustrating example device states and example power policies for dynamic current redistribution in a system in accordance with one or more example embodiments of the disclosure.

This disclosure relates to, among other things, dynamic current redistribution systems that may be used with electronic devices, such as e-readers, smartphones, tablets, laptops, and other devices. Embodiments of the disclosure may include external power storage devices or external battery devices that can supplement a battery of one or more electronic devices. Dynamic current redistribution systems may be implemented as hardware, software, firmware or combinations thereof. In one example embodiment, a dynamic current redistribution system may be run as part of system software that may reside on one of more memory devices of an electronic device.

Dynamic current redistribution systems may include a set of one or more charging policies, which may be implemented, for example, by a processor running system software and/or hardware or firmware of a device. These policies may determine how an available current may be directed among a device and an external battery device depending on a state of the device and/or a state of the external battery device. For example, when the device is not connected to any external power source, such as a charger connected to a wall outlet, the dynamic current redistribution system may implement a first set of charging policies, and when the device is connected to an external power source or an external battery device, the dynamic current redistribution system may implement a second set of charging policies.

Electronic devices may be charged via a charging device, such as a wall adapter or charger, that interfaces with an external power source. Charging devices may be connected to electronic devices and/or external batteries via a Universal Serial Bus (USB) charging cable or other hardware interface. Various charging devices may be configured to provide different amounts of current to an electronic device. For example, some charging devices may comply with a Battery Charging specification 1.2 (BC 1.2) standard, which may use certain wires (e.g., Data + and/or Data – wires, etc.) that can be used to indicate properties of the charging device to an electronic device. In one example, a BC 1.2 compliant charging device may indicate that the charging device can provide between about 0.5 and less than about 5 Amperes of current to a connected electronic device. A compliant charger may have different capabilities as indicated in the Battery Charging Specification Revision 1.2. If the electronic device has an internal battery (that may be fixed or removable) that can be charged at a maximum current load of 0.5 Amperes, embodiments of the disclosure may determine that the charging device has additional capacity (beyond the 0.5 A set forth in the BC 1.2). The additional capacity can be directed to an external battery to charge the external battery at the same time the internal battery is charging. By charging the internal battery and the external battery at the respective maximum current loads, or by drawing the maximum available current from a charging device, charging times for the internal battery and/or the external battery may be reduced or minimized.

Further, some charging devices may be able to safely provide more current than a rated maximum. For example, a wall adapter may be BC 1.2 compliant and may indicate to a device that the charging device has a rated maximum current of 1.0 Amperes. However, the charging device may actually be able to safely provide 1.4 Amperes of current, or a margin of an additional 0.4 Amperes. The additional margin may be used to charge the internal battery of a device and/or an external battery, thereby reducing charging times. In another example, a charging device may indicate a rated maximum of 2.4 Amperes for a tablet computer, but may presently be connected to a smartphone that requires 1.0 A. In such examples, the additional 1.4 Amperes of current may be used to reduce charging times of an internal battery of a device and/or to charge an external battery, rather than allowing the additional current to go unused.

In an example embodiment of the disclosure, when a device is connected to an external power source and an external battery device, the dynamic current redistribution system may determine a system current consumed by the systems of the device, which may include the processor, sensors, camera, display, accelerometer and other components of the device, and provide some or all of the remaining available current from the charging device, up to a maximum charging current, to the internal battery of the device. The maximum charging current may be, for example, the maximum current input limit to the internal battery during charging. If the charging device can provide additional current, after the internal device is charging at its maximum charging current, the additional current may be directed to the external battery device. In some embodiments, a charging priority may be determined, and a prioritized battery may be charged at a maximum charging current before the other battery is charged. For example, the external battery may be prioritized, in which case the external battery may be charged at its maximum current load before the internal battery is charged at its maximum current load, and vice versa. When the internal battery and/or the external battery is charged to a full capacity, then all the excess current not consumed by the systems of the device may be directed to charging the other battery. In an embodiment, the device and the external battery device may each include a power management integrated circuit (PMIC) in communication with one another when connected to control power distribution within the respective devices.

In another example embodiment, when the device is connected to the external battery device but not an external power source, the external battery device may transition to a boost mode where it is providing power to charge the internal battery of the device as well as provide a system current to power the system, which may be referred to as the external battery current. In such a state, the dynamic current redistribution system may determine a system current consumed by the systems of the device, and provide a maximum charging current to the internal battery of the device. If the sum of the system current and the maximum charging current is greater than the current received from the external battery device in a boost mode, then the dynamic current redistribution system may increase the current received from the external battery device such that this current is equal to or greater than the sum of the system current and the maximum charging current. In an embodiment, the external battery device may charge the internal battery of the device up to a first threshold capacity, which may be a 100% or less than 100%, for example 95%, after which the device may suspend charging the internal battery of the device and the external battery device may reduce the current supplied to the device to just the system current to conserve its own battery power. However, when the device battery reaches a second threshold capacity, such as 85%, then the external battery may resume providing current in the boost mode that may be used by the device to charge the internal battery.

In all of the example embodiments disclosed the dynamic current redistribution system may monitor the state of the device, including the state of the charge of the internal battery, detect a connection with an external battery device and/or external power source, and dynamically redistribute current depending on the state of the device and the state of the charge of the internal battery. Each device state may be associated with a set of policies, which will be described in further detail in the following example embodiments.

Illustrative Device and Operation

FIG. 1 is a schematic diagram of a system 100 illustrating various device states of an electronic device 102 and its corresponding power policies in accordance with one or more example embodiments of the disclosure. Device 102 may be any electronic device such as an e-reader, a smartphone, a tablet, a phablet, or any variation thereof. Device 102 may include a display screen 104, which may be used by a user to read or consume contents being displayed thereon. Device 102 may include one or more control devices 108 which may be used to control the operation of the device 102, such as navigating the content being displayed on the display screen 104 or to control the settings of the display screen 104 according to a user's preference. In addition, device 102 may include other devices for interacting with the user, such as a microphone, speaker, touch display, camera, etc. Device 102 may also include an internal battery 106 which may provide power to various components of the device 102. The dynamic current redistribution system for device 102 may be implemented as hardware, software, firmware or combinations thereof. In one example embodiment, the dynamic current redistribution system may be run as part of the system software and the system software may reside on one of more memories of the electronic device, which may be accessed by one or more processors of the electronic device.

The dynamic current redistribution system may include a set of policies, which may be implemented, for example, by the processor running the system software. These policies may determine how an available current may be distributed between the device and the external battery device depending on a state of the device. In a first example state, the device may not be connected to any external power source or any external battery device. In such a device state, the power policy of the dynamic current redistribution system may include discharging the internal battery of the device to power the various components of the device 102. In a second example state, the device 102 may be connected to an external battery device 110. The external battery device 110 may include a battery 112, which may be operatively coupled to a connector (not shown) for connecting the external battery device 110 to the device 102. The connector may have, for example, multiple interconnect pins or conductive elements, each configured to perform a separate function. Device 102 may have a corresponding connector (not shown) which may be operatively coupled to the internal battery 106 on device 102. In one example embodiment, device 102 and external battery device 110 may be connected via an interface 116. Interface 116 may include a ground (GND) line, a power (VBUS) line, a power control (nOTG) line, and an inter-integrated circuit (I2C) serial data terminal or line (SDA) and a series clock terminal or line (SCL). The SDA line of the I2C bus interface may be multiplexed to receive a data operation as well as an interrupt or signal operation. For example, the SDA line may not only detect that the external battery device is docked (connected) or undocked (disconnected), but the devices may also be able to perform data operations including read/write operations on this SDA line.

In this device state, the power policy of the dynamic current redistribution system may include powering the components of the device 102 using the external battery device 110, and providing a maximum charge current to the device battery 106. Another policy may include powering the device battery 106 up to a certain level and suspending charging once a charge threshold is met. For example, the external battery device 110 may charge the internal battery 106 up to 95% and then suspend charging until the charge level in the internal battery reaches 85%, and then at which point the external battery device 110 may resume charging the internal battery 106. The internal battery 106 and the external battery 112 may respectively include any battery, for example, a lithium ion battery, a nickel cadmium battery, a lithium polymer battery, or any high energy density electrochemical devices. In addition, the internal battery 106 and the external battery 112 may have different power capacities. For example, internal battery 106 may be a 3 to 4.2V battery and the external battery 112 may be a 3 to 4.5V battery. However, since the battery life of the internal battery 106 may be limited, the external battery 112 may be used to supplement the power provided by the internal battery 106.

In a third device state, device 102 may be connected to an external power source 114. External power source 114 may be any power source, such as a universal serial bus (USB) power source, power from a laptop, power from a power plug, or any power source with at least 5V output. The external power source 114 may be connected to the device 102 via a connection interface 118, which may be a USB interface or any other interface suitable to provide device 102 with power depending on the external power source 114. In such a device state, the policy of the dynamic current redistribution system may include powering the components of the device 102 using power from the external power source. Another policy may include providing maximum charge current to the device battery 106 so that the internal battery is provided with adequate charge.

In a fourth device state, the device 102 may be connected to an external power source 114 as well as an external battery device 110. The power from the external power source 114 may be provided to the device 102 via interface 118 while the external battery device 110 may be connected to the device 102 via interface 116. In this device state, the policies of the dynamic current redistribution system may include powering the components of the device 102 using the external power source 114. Another policy may include providing maximum charge current to the device battery 106 from the external power source 114. Once the components of the device 102 are powered and the maximum charge current to the device battery 106 is provided, any extra current may be directed to the external battery device 110 to charge the external battery 112. Another policy may include suspending charging of the internal battery 106 when a charge threshold is met. For example, when a charge on the internal battery 106 reaches a 100% or near 100%, the dynamic current redistribution system may direct all excess current to the external battery 112 after providing the components of the device 102 a system current. In all of the example embodiments disclosed the dynamic current redistribution system may monitor the state of the device 102, detect a connection with an external battery device 110 and/or external power source 114, and dynamically redistribute current according to the policies that apply based on the state of the device.

Figure 2A:
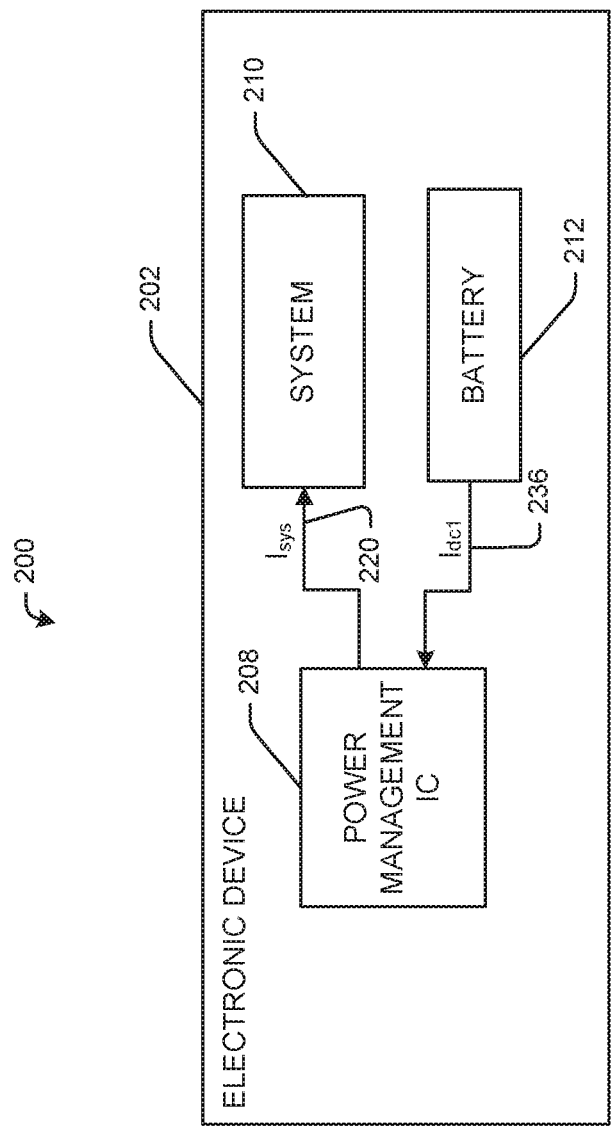
FIG. 2A is a schematic diagram illustrating system architecture of an electronic device in accordance with one or more example embodiments of the disclosure.

Turning now to FIG. 2A, illustrated is a system 200 including device 202, according to one or more example embodiments. Device 202 may be similar to device 102 illustrated and described in FIG. 1. Device 202 may include a power management IC (PMIC) 208 that may distribute and regulate power between various components of the device 202. For example, the PMIC 208 may receive a discharging current ($I_{dc1}$) from battery 212 on terminal or line 236 and provide a system current ($I_{sys}$) to the system 210 on terminal or line 220. The PMIC 208 may provide the system current ($I_{sys}$) consumed by the system 210, which may include the processor, sensors, camera, display, accelerometer and other components of the device 202, and may be in the range of 10 mA-2.5 A. The internal battery 212 may include any battery, for example, a lithium ion battery, a nickel cadmium battery, a lithium polymer battery, or any high energy density electrochemical devices. Internal battery 212 may have an actual internal battery voltage ($V_{bat-d}$) of, for example, 3-4.2V. In this device state, device 202 may power one or more components of the device using power from internal battery 212, and the internal battery may discharge powering these components.

Figure 2B:
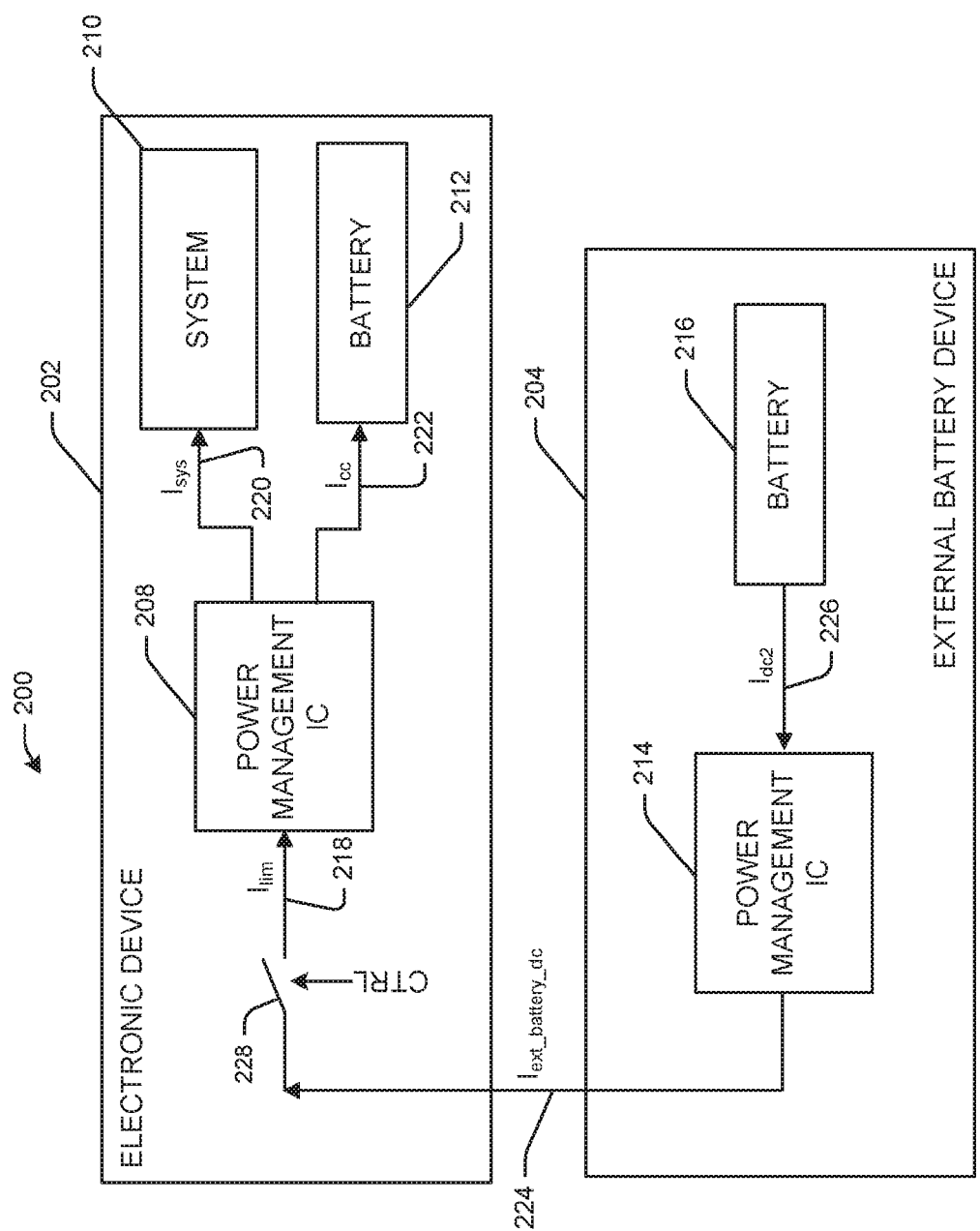
FIG. 2B is a schematic diagram illustrating dynamic current redistribution in a system including an electronic device and an external battery device in accordance with one or more example embodiments of the disclosure.

FIG. 2B illustrates a system 200 including device 202 as described in FIG. 2A connected to an external battery device 204, according to one more example embodiments. The external battery device 204 may include a PMIC 214, which may receive discharging current ($I_{dc2}$) from the external battery 216 on terminal or line 226. The external battery 216 may include any battery, for example, a lithium ion battery, a nickel cadmium battery, a lithium polymer battery, or any high energy density electrochemical devices. External battery 216 may have an actual external battery voltage ($V_{bat-b}$) of, for example, 3-4.35V. External battery device 204 may be connected to device 202 via interface 224. Interface 224 may include a ground (GND) line, a power (VBUS) line, a power control (nOTG) line, and an inter-integrated circuit (I2C) serial data terminal or line (SDA) and a series clock terminal or line (SCL). The SDA line of the I2C bus interface may be multiplexed to receive a data operation as well as an interrupt or signal operation. For example, the SDA line may not only detect that the external battery device is docked (connected) or undocked (disconnected), but the devices may also be able to perform data operations including read/write operations on this SDA line. Connection on line 224 may be controlled by a switch 228, which may be controlled by a processor of the device 202. The processor may reside in system 210 and access the memory of the device 202 which stores the dynamic current redistribution system. When the external battery device 204 is connected to the device 202, device 204 may transition to a boost mode where it may provide power to the device 202, which may be referred to as the external battery current. The dynamic current redistribution system may implement policies such that the external battery device 204 is providing a first input current limit ($I_{lim}$) on the PMIC 208 at terminal or line 218. The first input current limit on the PMIC 208 may be for example in the range of 0-2.54 A. PMIC 208 may receive this power and provide a system current ($I_{sys}$) to the system 210 via terminal or line 220, and a maximum charging current for the internal battery 212. The output current limit ($I_{ext\_battery\_dc}$) of the external battery device 204 in a boost mode can range, for example, from 120 mA-1 A.

One example policy of the dynamic current redistribution system may include that if a sum of the system current ($I_{sys}$) to the system 210 and the maximum charging current ($I_{cc}$) for the internal battery 212 is greater than the output current limit ($I_{ext\_battery\_dc}$) of the external battery device 204, then $I_{ext\_battery\_dc}$ may be increased to a point where $I_{ext\_battery\_dc}$ is equal to or greater than sum of the system current ($I_{sys}$) to the system 210 and the maximum charging current ($I_{cc}$) for the internal battery 212. Another policy may be implemented by the dynamic current redistribution system where the external battery device 204 may provide charging current to the internal battery 212 such that the internal battery 212 is charged up to a first threshold level, such as 100% or near 100% such as 95%, and then the external battery device 204 suspends the charging the device 202 to conserve its battery. Once the internal battery 212 reaches a second threshold level, such as 85% or 80%, then the external battery device 204 may resume providing power to the device 202 until the internal battery 212 reaches the first threshold level again. One example policy or rule that may be implemented in this case is $I_{lim}=(I_{sys}+I_{cc})*\text{Eff}_{device}$ where $\text{Eff}_{device}$ is the efficiency of the PMIC or first battery charging circuit 208. For $I_{lim}>0$, $\text{Eff}_{device}$ may be in the range of 67-112%, for example. Another policy or rule that may be implemented in this case is $I_{ext\_battery\_dc}=I_{fc}*\text{Eff}_{battery}$ where $\text{Eff}_{battery}$ is the efficiency of the second PMIC 214 or second battery charging circuit. Efficiency of the second PMIC 214 may be calculated using $\text{Eff}_{battery}=V_{out}/V_{in}*\text{Boost Efficiency}$, and if $I_{ext\_battery\_dc}>0$ then $\text{Eff}_{battery}$ may be in the range of 128-222% in a charging mode, for example, and if $I_{ext\_battery\_dc}<0$ then $\text{Eff}_{battery}$ may be in the range of 67-116% in a boosting mode when the external battery device 204 is providing power to the electronic device 202, which may be referred to as the external battery current.

Figure 2C:
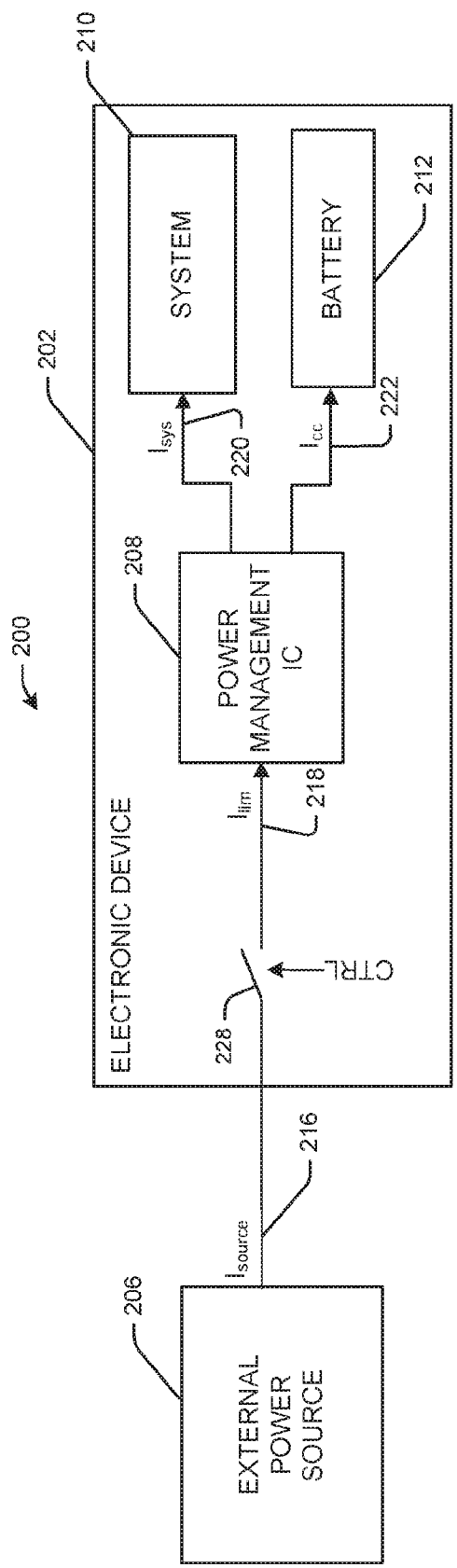
FIG. 2C is a schematic diagram illustrating dynamic current redistribution in a system including an electronic device and an external power source in accordance with one or more example embodiments of the disclosure.

FIG. 2C illustrates a system 200 including device 202 as described in FIGS. 2A and 2B connected to an external power source 206, according to one more example embodiments. The external power source 206 may include any power source such as a USB power source, power from a laptop computer, a universal serial bus interface circuit (UIC) automatic power supply detection (APSD) power source or any electrical power source that may provide at least 5V output. External power source 206 may provide a source current $I_{source}$ via terminal or line 216, which may be controlled by switch 228 by the processor of the device 202. Source current ($I_{source}$) from the external power source 206 may have an example range of 100-2100 mA. In this device state, the dynamic current redistribution system may implement policies such that the current from the external power source 206 provides a system current ($I_{sys}$) to the system 210 via terminal or line 220 to power various components of the device 202, and a maximum charging current for the internal battery 212 of the device 202. The processor of the device 202 may control this input via switch 228 and provide first input current limit on the PMIC 208 so that the PMIC 208 may provide a system current ($I_{sys}$) to the system 210 via terminal or line 220, and a maximum charging current ($I_{cc}$) for the internal battery 212.

Figure 2D:
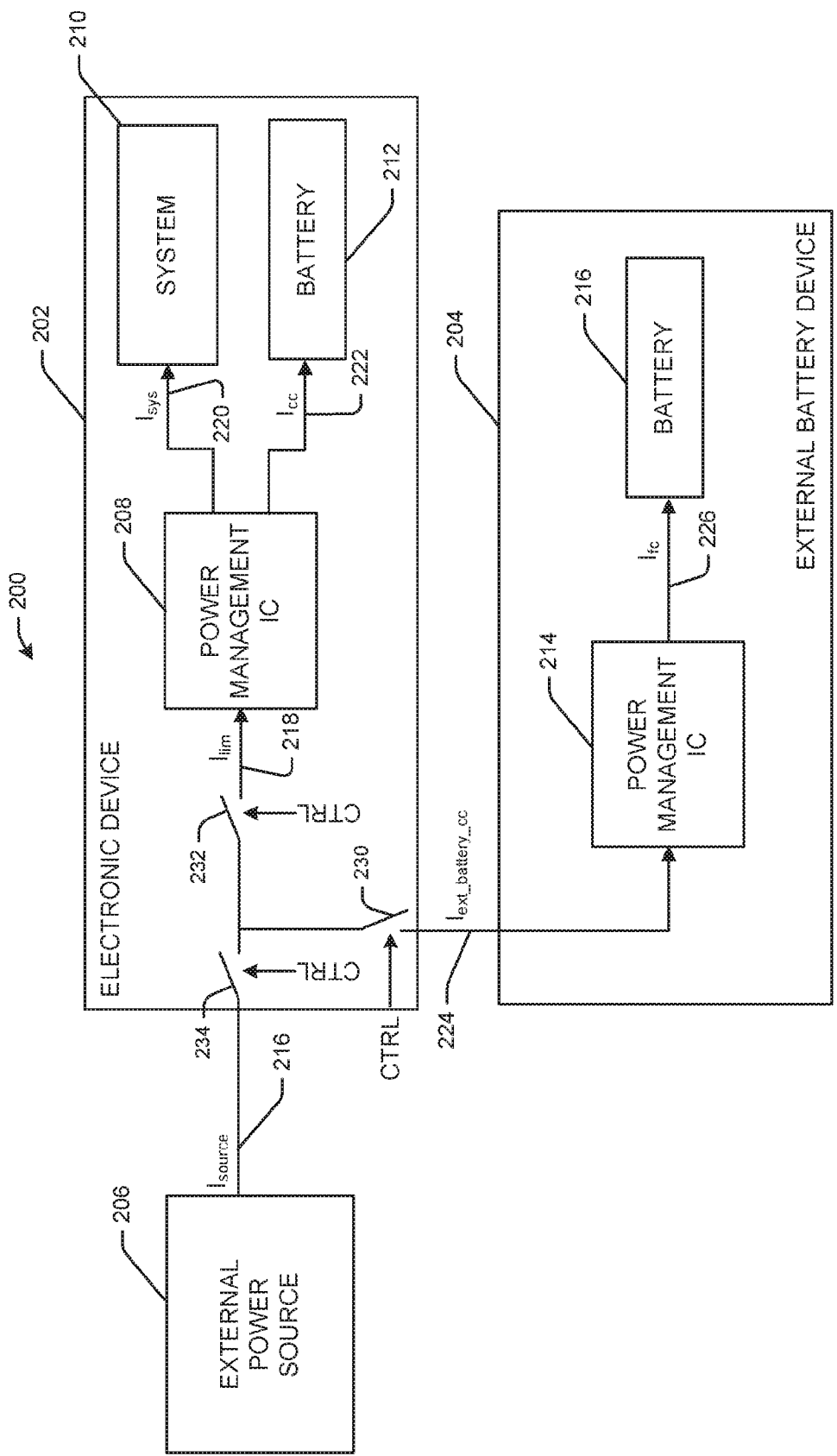
FIG. 2D is a schematic diagram illustrating dynamic current redistribution in a system including an electronic device, an external battery device, and an external power source in accordance with one or more example embodiments of the disclosure.

FIG. 2D illustrates a system 200 including device 202 as described in FIGS. 2A and 2B connected to an external power source 206 and an external battery device 204, according to one more example embodiments. The external power source 206 may include any power source such as a USB power source, power from a laptop computer, a universal serial bus interface circuit (UIC) automatic power supply detection (APSD) power source or any electrical power source that may provide at least 5V output. In this device state, the dynamic current redistribution system may implement policies such that the processor may determine a system current ($I_{sys}$) consumed by components of the device 202, and determine a maximum charging current ($I_{cc}$) of the internal battery 212, and the PMIC 208 may direct this current to the respective components. The processor may also determine a power source current ($I_{source}$) received by the device 202 from the external power source 206, which may be the maximum amount of current a power source can supply. The processor, according to one or more policies of the dynamic current redistribution system, may determine that the power source current minus the system current is greater than the maximum charging current, and direct a first charging current ($I_{cc}$) to the internal battery 212. The first charging current may be the maximum charging current, for example, 133 mA, or a portion thereof. The processor may also determine the external battery device 204 is connected to the device 202. When the external battery 204 is connected, the processor may determine the power source current is greater than the sum of the system current and the maximum charging current, and direct a second charging current ($I_{fc}$) to the external battery 216, which may be in the range of 300-700 mA. The second charging current may be the power source current minus the sum of the system current and the maximum charging current or a portion thereof. When the internal battery 212 is charged to a first threshold capacity, such as 100% or 95%, the processor may instruct the PMIC 208 to direct a third charging current to external battery 216. The third charging current may be the power source minus system current or a portion thereof, according to one or more example embodiments. By implementing the above example policies, the dynamic current redistribution system may be able to provide maximum charge current to the internal battery 212 so the internal battery is always charged to the extent possible, and after the internal battery is fully charged, the dynamic current redistribution system may direct all excess current to the external battery 216 after providing sufficient system current to the system 210. By doing this, the external battery 216 may reserve battery charge for when the external power source is not connected to the device 202 and the internal battery 212 may be running low.

The following paragraphs summarize terms used in the above example embodiments, and provide an example range of values for each of the terms. The values provided below are purely exemplary, and any of the values can be replaced with suitable ranges based on an end application.

$I_{source}$—Source current from a power source (example range 100-2100 mA)

$I_{lim}$—A first input current limit on the first PMIC (example range 0-2.54 A)

$I_{act}$—An actual charging current of the first battery (example range 0-133 mA), which may be the amount of current going into the first battery at a particular instance, and may be determined by the PMIC.

$I_{cc}$—A maximum charging current for the first battery (e.g. 133 mA)

$I_{fc}$—A maximum (fast charge) charging current for the second battery (example range 300-700 mA)

$I_{sys}$—Current consumed by the system of the electronic device (example range 10 mA-2.5 A)

$I_{ext\_battery\_dc}$—Output current limit of the external battery device in a boost mode (example range 120 mA-1 A), which may be referred to as the external battery current $\text{Eff}_{device}$—A first efficiency of the first PMIC or first battery charging circuit $\text{Eff}_{battery}$—A second efficiency of the second PMIC or second battery charging circuit $V_{bus}$—Voltage at the input to the electronic device; e.g. 5V $V_{bat-b}$—Actual external battery voltage (example range 3-4.35V)

$V_{bat-d}$—Actual internal battery voltage (example range 3-4.2V)

One example policy or rule that may be implemented by the dynamic current redistribution system in this device state may include $I_{source} > I_{lim} + I_{fc}*(V_{bat-b}/V_{bus}*\text{Eff}_{battery})$ where $V_{bus}$ is the voltage at the input to the electronic device; e.g. 5V, $V_{bat-b}$ is the actual external battery voltage, for example 3-4.35V, and $\text{Eff}_{battery}$ is the efficiency of the PMIC 214 or second battery charging circuit. Another example policy or rule that may be implemented by the dynamic current redistribution system in this device state may include and another example policy or rule may be $I_{lim} > (I_{cc} + I_{sys})*(V_{bat-d}/V_{bus}*\text{Eff}_{device})$, where $V_{bat-d}$ is the actual internal battery voltage, for example 3-4.2V, and $\text{Eff}_{device}$ is the efficiency of the PMIC 208 or first battery charging circuit.

Illustrative Processes

Figure 3:
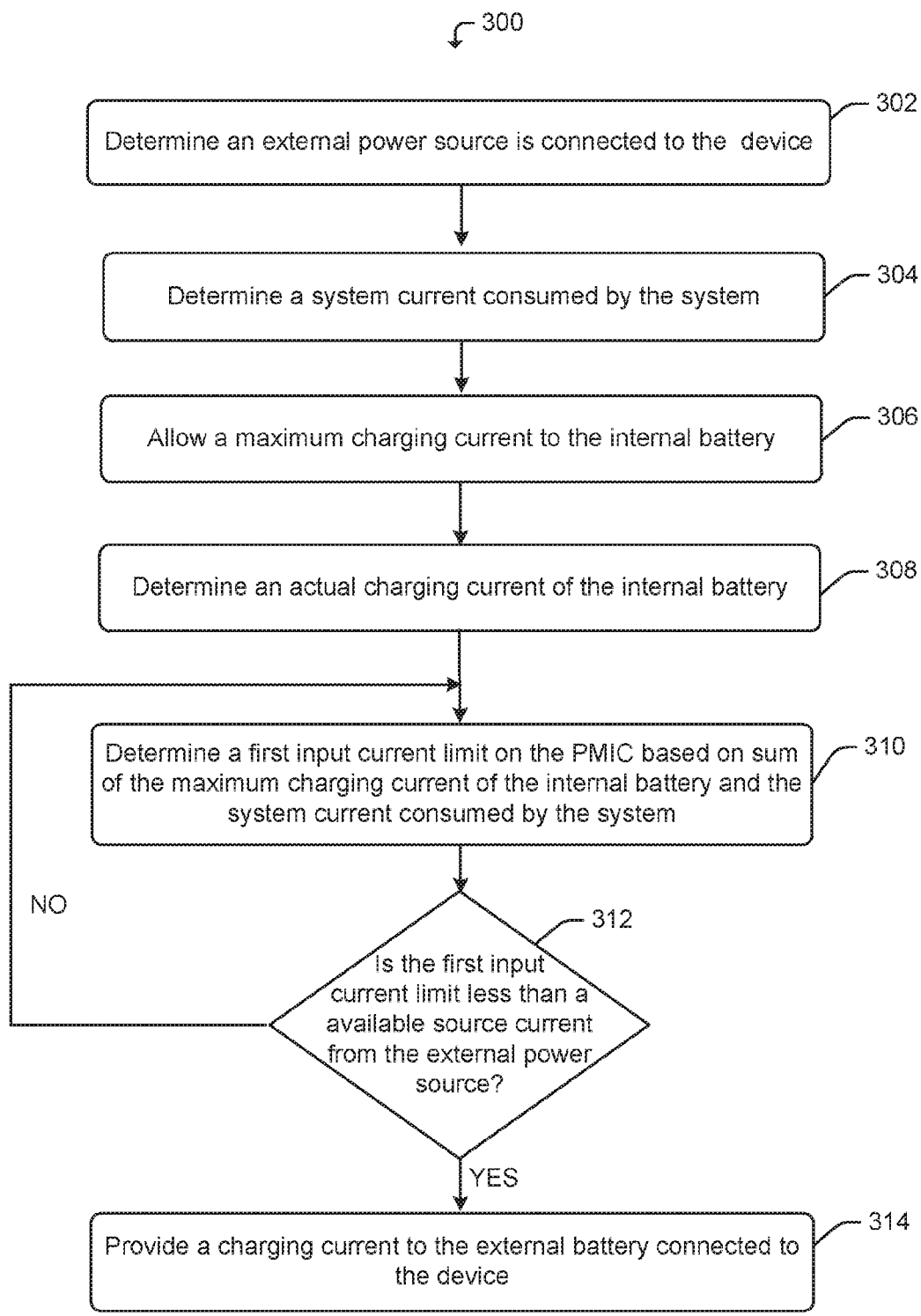
FIG. 3 is a process flow diagram of an illustrative method for dynamic current redistribution in a system in accordance with one or more example embodiments of the disclosure.

FIG. 3 is a process flow diagram of an illustrative method 300 for dynamic current redistribution in an electronic device in accordance with one or more example embodiments of the disclosure. Referring to FIG. 3, at block 302, the processor of the device may determine an external power source is connected to the device. The external power source may include any power source such as a USB power source, power from a laptop computer, a universal serial bus interface circuit (UIC) automatic power supply detection (APSD) power source or any electrical power source that may provide at least 5V output. At block 304, the processor may determine a system current consumed by the system, which may include the processor, sensors, camera, display, accelerometer and other components of the device. At block 306, the processor may allow a maximum charging current to the first or internal battery and determine an actual charging current of the first or internal battery at block 308. At block 310, the processor may determine a first input current limit on the PMIC based on a sum of the maximum charging current of the internal battery and the system current consumed by the system, and provide this current to the PMIC of the device. At block 312, the processor may determine if the first input current limit is less than a source current from the external source power, and if the external source power is not, then the process may flow back to block 310 where the processor determines a first input current limit on the PMIC based on a sum of the maximum charging current of the internal battery and the system current consumed by the system. However, if the first input current limit is less than a source current from the external power source, then the processor may direct a charging current to a second battery in an external battery device that may be coupled to the electronic device at block 314. This power may be received by a PMIC on the external battery device and may be distributed to the second battery in the external battery device.

One or more operations of the method 300 may have been described above as being performed by the device 102, 202 or external battery device 110, 204. It should be appreciated, however, that any of the operations of method 300 may be performed, at least in part, in a distributed manner by one or more other components. Further, the operations of method 300 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Figure 4:
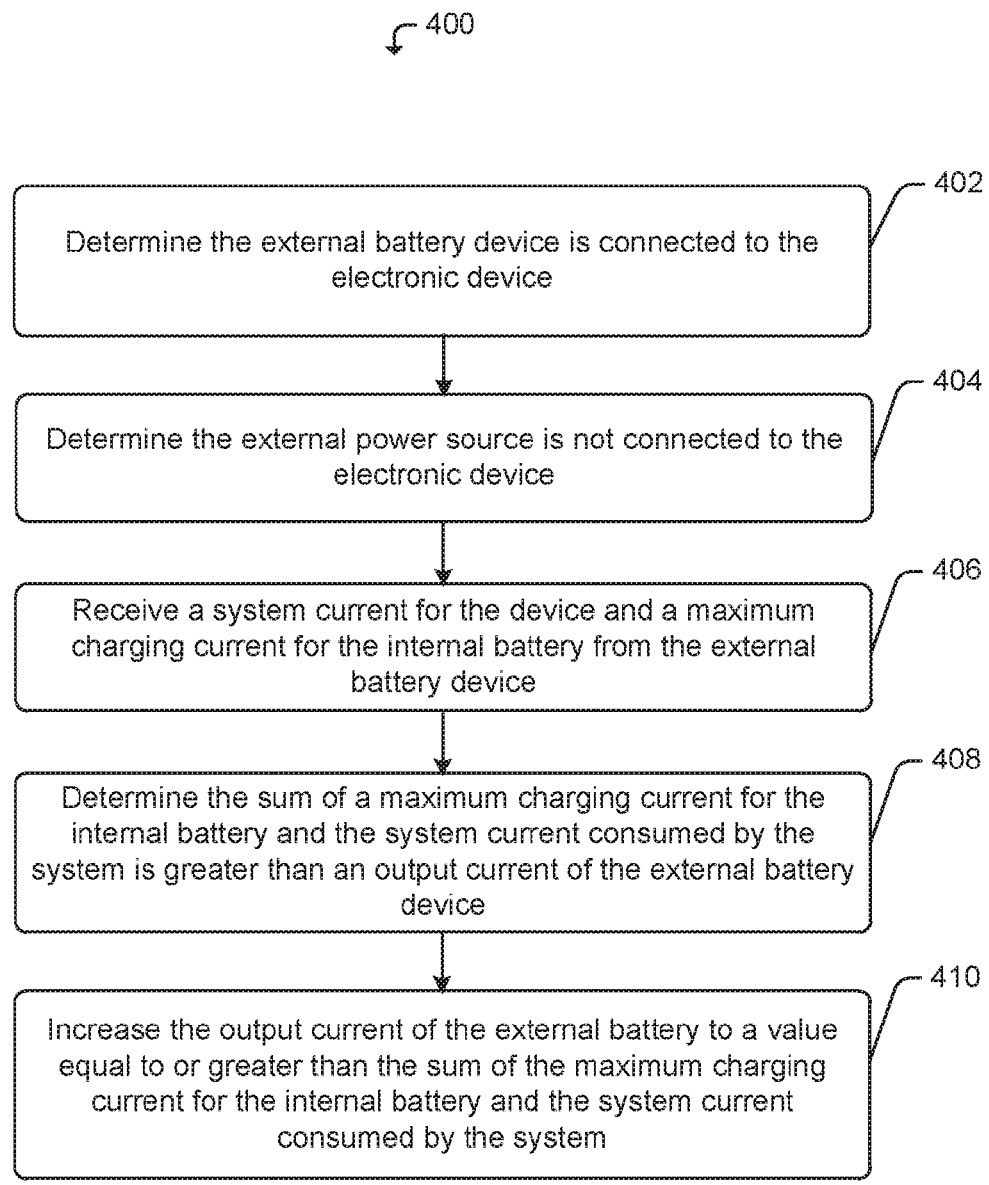
FIG. 4 is a process flow diagram of an illustrative method for dynamic current redistribution in a system in accordance with one or more example embodiments of the disclosure.

FIG. 4 is a process flow diagram of an illustrative method 400 for dynamic current redistribution in an electronic device in accordance with one or more example embodiments of the disclosure. Referring to FIG. 4, at block 402, the processor of the device may determine an external battery device is connected to the device. At block 404, the processor may determine the external power source is not connected to the device. At block 406, the system, which may include the processor, sensors, camera, display, accelerometer and other components of the device, may receive a system current for powering one or more components of the device. The battery may receive a maximum charging current from the PMIC receiving power from the external battery device. At block 408, the processor may determine the sum of a maximum charging current for the internal battery and the system current consumed by the system is greater than an output current of the external battery device, which may be referred to as the external battery current. At block 410, the processor may increase the output current of the external battery device to a value that may be equal to or greater than the sum of the maximum charging current for the first or internal battery and the system current consumed by the system to power one or more components of the device.

One or more operations of the method 400 may have been described above as being performed by the device 102, 202 or external battery device 110, 204. It should be appreciated, however, that any of the operations of method 400 may be performed, at least in part, in a distributed manner by one or more other components. Further, the operations of method 400 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Figure 5:
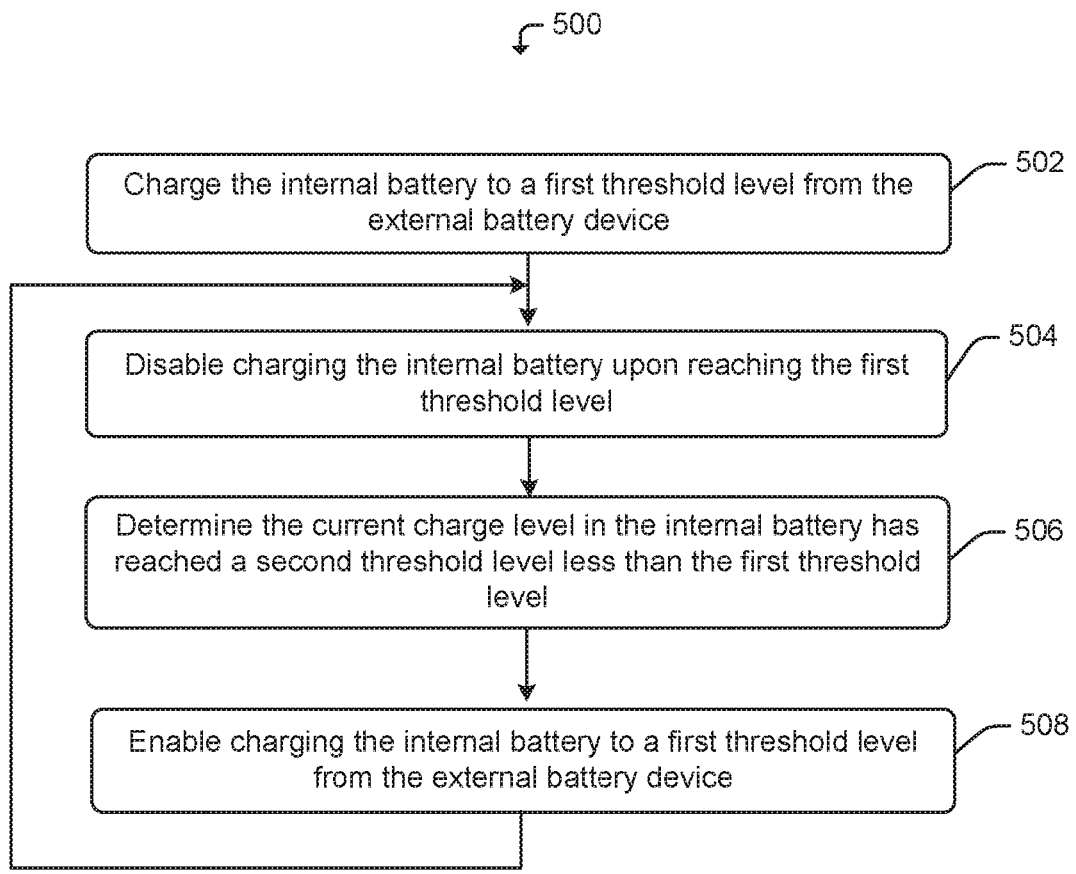
FIG. 5 is a process flow diagram of an illustrative method for dynamic current redistribution in a system in accordance with one or more example embodiments of the disclosure.

FIG. 5 is a process flow diagram of an illustrative method 500 dynamic current redistribution in an electronic device in accordance with one or more example embodiments of the disclosure. Referring to FIG. 5, the dynamic current redistribution system may, in method 500, implement a policy such that the device is charged to a first threshold level, which may be near 100%, but not 100% such that the external battery device may be able to conserve battery for a later time. For example, in block 502, the processor may charge the first or internal battery to a first threshold level from the external battery device. An example percentage charge for the first threshold level may be 95%. At block 504, the processor may disable charging the first or internal battery upon reaching the first threshold level. At block 506, the processor may determine the current charge level in the first or internal battery has reached a second threshold level, which may be less than the first threshold level. An example percentage charge for the second threshold level may be 85%. At block 508, the processor upon detecting that the current charge level in its internal battery has reached the second threshold level, may enable charging the first or internal battery back to the first threshold level from the external battery device. This process may be carried out in a loop any time the external battery device is connected to the device.

In one example embodiment, a similar method may be used by the processor when the external power source is also connected to the device. For example, when the external power source is connected, the PMIC may charge the internal battery to a first threshold level, which may be 100% or near 100%. Once the first threshold level is reached, the processor may direct excess power to the second battery in the external battery device after providing the system current for powering the system components. However, once the battery is 100% charged, all of the excess current may be directed to the second battery in the external battery device until the charge in the internal battery reaches a second threshold level less than the first threshold level. At which point, the PMIC may start providing a maximum charge current to the internal battery again until it reaches the first threshold level.

One or more operations of the method 500 may have been described above as being performed by the device 102, 202 or external battery device 110, 204. It should be appreciated, however, that any of the operations of method 500 may be performed, at least in part, in a distributed manner by one or more other components. Further, the operations of method 500 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.

Illustrative Device Architecture

Figure 6:
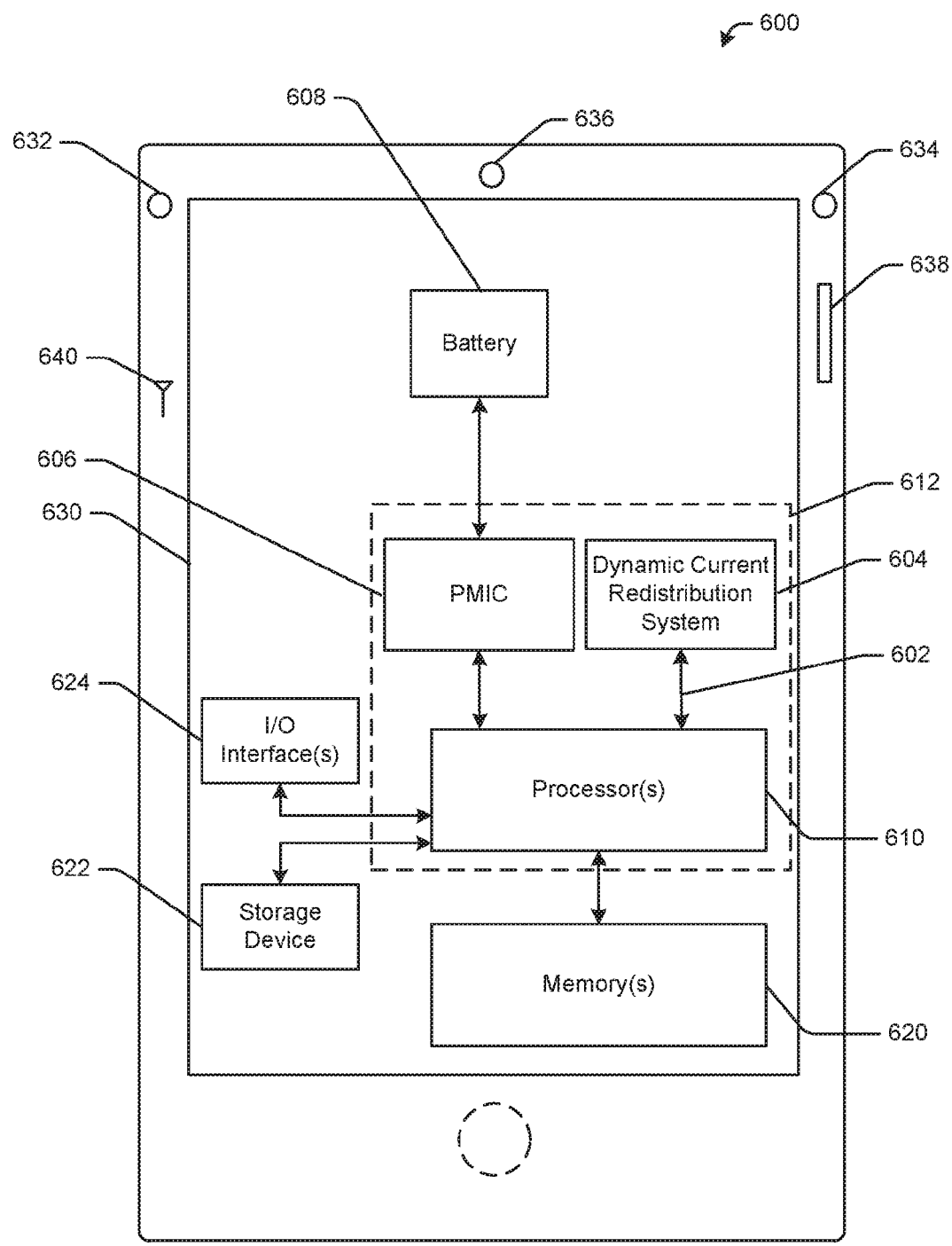
FIG. 6 is a diagram of an illustrative physical implementation of an electronic device in accordance with one or more example embodiments of the disclosure.

FIG. 6 is a schematic diagram illustrating an example user device 600 with a dynamic current redistribution system 604 as described in the above example embodiments. In operation, the user device 600 may include computer-readable and computer-executable instructions that reside on the user device 600, as is discussed further below. The user device 600 may include an address/data bus 602 for conveying data among components of the user device 600. Each component within the computing device 600 may also be directly connected to components in addition to (or instead of) being connected to other components across the bus 602.

The dynamic current redistribution system 604 may be included within the user device 600, such as a mobile communications device, a personal electronic device, an imaging system, or any electronic device. The user device 600 may include, but is not limited to, a personal computer, a desktop computer, a notebook computer, a laptop computer, a personal digital assistant, an electronic book (ebook) reader, a tablet computing device, a pad computing device, a smartphone, wearable devices, or combinations thereof. The user device 600 may include one or more application processor(s) 610 and one or more memory(s) 620.

In some example embodiments, the processors 610 of the user device 600 may be implemented as appropriate in hardware, software, firmware, or combinations thereof. Software or firmware implementations of the processors 610 may include computer-executable or machine-executable instructions written in any suitable programming language to perform the various functions described. Hardware implementations of the processors 610 may be configured to execute computer-executable or machine-executable instructions to perform the various functions described. The one or more processors 610 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 600 may also include a chipset (not shown) for controlling communication between the one or more processors 610 and one or more of the other components of the user device 600. The one or more processors 610 may also include one or more application specific integrated circuits (ASICs) or application specific standard products (ASSPs) for handling specific data processing functions or tasks.

Processor(s) 610 may be coupled to a power management IC (PMIC) 606, which may receive power from internal battery 608 and distribute power to various components of the device 600. PMIC 606 may be configured to manage power between various components of the device 600. The processor(s) 610, the PMIC 606, and/or dynamic current redistribution system 604 may be part of a processing unit 612, which may dynamically determine the amount of current to be provided to each of the components based on the state of the device 600, as illustrated in FIG. 1, for example. Although dynamic current redistribution system 604 is illustrated as being outside of one or more memories 620, it may be stored as software or firmware within the one or more memories 620, and may be accessed by the one or more processors 610 and/or PMIC 606.

The memory/storage 620 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, non-volatile magnetoresistive (MRAM), or combinations thereof.

The memory 620 may store program instructions that are loadable and executable on the processor(s) 610, as well as data generated or received during the execution of these programs. The memory 620 may include one or more operating systems (O/S) and one or more application software that may be executed by the processors 610 to control the user device 600 and the dynamic current redistribution system 604. The memory 620 may also provide temporary "working" storage at runtime for any applications being executed on the processors(s) 610. The computer instructions may be stored in a non-transitory manner in non-volatile memory 620, storage 622, or an external device. Alternatively, some or all of the executable instructions may be embedded in hardware or firmware in addition to or instead of software. The user device 600 may also include external battery monitor 608, which may be operatively coupled to the dynamic current redistribution system 604 and the processor 610. External battery monitor 608 may be implemented as appropriate in hardware, software, firmware, or combinations thereof. Software or firmware implementations of the processors may include computer-executable or machine-executable instructions written in any suitable programming language to perform the various functions described.

The user device 600 may include input/output device interfaces 624. A variety of components may be connected through the input/output device interfaces 624, such as a display or display screen 630 having a touch surface or touchscreen, an audio output device for producing sound, such as speaker(s) 632, one or more audio capture device(s), such as a microphone or an array of microphones 634, one or more image and/or video capture devices, one or more haptic units 638, and other components. The display 630, speaker(s) 632, microphone(s) 634, haptic unit(s) 638, and other components may be integrated into the user device 600 or may be separate.

The display 630 may be a video output device for displaying images. The display 630 may be a display of any suitable technology, such as a liquid crystal display, an organic light emitting diode display, electronic paper, an electrochromic display, a cathode ray tube display, a pico projector or other suitable component(s). The display 630 may also be implemented as a touchscreen and may include components such as electrodes and/or antennae for use in detecting stylus input events or detecting when a stylus is hovering above, but not touching, the display 630.

The input/output device interfaces 624 may also include an interface for an external peripheral device connection such as universal serial bus (USB), FireWire, Thunderbolt, Ethernet port or other connection protocol that may connect to one or more networks. The input/output device interfaces 624 may also include a connection to one or more antennas 640 to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 600 may be any suitable electronic device such as, for example, a desktop or laptop PC, a smartphone, a digital personal assistant, a tablet, a wearable computing device, or the like. In certain example embodiments, the device 600 may include one or more antennas 640 including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The battery may be any suitable type of battery including, but not limited to, any Li-ion or Li-based battery. Packaging material for the battery may include, without limitation, various tri-laminated combinations of aluminum, graphene, nylon and PET or other hermetic and sealable packaging materials or combinations thereof.

Referring now to other components of the device 600, the bus(es) may include at least one of a system bus, a memory bus, an address bus, or a message bus, and may permit exchange of information (e.g., data (including computer-executable code), signaling, etc.) between various components of the device 600. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory(s) 620 of the device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 620 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 620 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage device 622 may include removable storage and/or non-removable storage including, but not limited to, magnetic storage, optical disk storage, solid-state storage, and/or tape storage. The data storage 622 may provide non-volatile storage of computer-executable instructions and other data. The memory 620 and the data storage 622, removable and/or non-removable, are examples of computer-readable storage media (CRSM) as that term is used herein.

The data storage 622 may store computer-executable code, instructions, or the like that may be loadable into the memory 620 and executable by the processor(s) 610 to cause the processor(s) 610 to perform or initiate various operations. The data storage 622 may additionally store data that may be copied to memory 620 for use by the processor(s) 610 during the execution of the computer-executable instructions. Moreover, output data generated as a result of execution of the computer-executable instructions by the processor(s) 610 may be stored initially in memory 620, and may ultimately be copied to data storage 622 for non-volatile storage.

More specifically, the data storage 622 may store one or more operating systems (O/S) and one or more applications, program modules, or the like. Any applications stored in the data storage 622 may be loaded into the memory 620 for execution by the processor(s) 610. Further, any data (not shown) stored in the data storage may be loaded in to the memory 620 for use by the processor(s) 610 in executing computer-executable code.

The processor(s) 610 may include any suitable processing unit capable of accepting data as input, processing the input data in accordance with stored computer-executable instructions, and generating output data. The processor(s) 610 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 610 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 610 may be capable of supporting any of a variety of instruction sets.

Referring now to other illustrative components depicted as being stored in the data storage 622, the O/S may be loaded from the data storage 622 into the memory 610 and may provide an interface between application(s) executing on the device 600 and hardware resources of the device 600. More specifically, the O/S may include a set of computer-executable instructions for managing hardware resources of the device 600 and for providing common services to application programs (e.g., managing memory allocation among various application programs). The O/S may include any operating system now known or which may be developed in the future including, but not limited to, any server operating system, any mainframe operating system, or any other proprietary or non-proprietary operating system.

The input/output (I/O) interface(s) 624 may facilitate the receipt of input information by the device 600 from one or more I/O devices as well as the output of information from the device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 600 or may be separate. The I/O devices may further include, for example, any number of peripheral devices such as data storage devices, printing devices, and so forth.

The I/O interface(s) 624 may also include an interface for an external peripheral device connection such as universal serial bus (USB), FireWire, Thunderbolt, Ethernet port or other connection protocol that may connect to one or more networks. The I/O interface(s) 624 may also include a connection to one or more of the antenna(s) 640 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 600 may further include one or more network interfaces via which the device 600 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The sensor(s)/sensor interface(s) 632, 634, 636, may include or may be capable of interfacing with any suitable type of sensing device such as, for example, ambient light sensors, inertial sensors, force sensors, thermal sensors, image sensors, magnetometers, and so forth. Example types of inertial sensors may include accelerometers (e.g., MEMS-based accelerometers), gyroscopes, and so forth.

The antenna(s) 640 may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

As previously described, the antenna(s) 640 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 640 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 6 GHz channels (e.g. 802.11n, 802.11ac), or 60 GHZ channels (e.g. 802.11ad). In alternative example embodiments, the antenna(s) 640 may be configured to transmit or receive radio frequency signals within any suitable frequency range forming part of the unlicensed portion of the radio spectrum.

The antenna(s) 640 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) may include any suitable radio component(s) for—in cooperation with the antenna(s) 640—transmitting or receiving radio frequency (RF) signals in the bandwidth and/or channels corresponding to the communications protocols utilized by the device 600 to communicate with other devices. The transceiver(s) may include hardware, software, and/or firmware for modulating, transmitting, or receiving—potentially in cooperation with any of antenna(s) 640—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) may further include hardware, firmware, or software for receiving GNSS signals. The transceiver(s) may include any known receiver and baseband suitable for communicating via the communications protocols utilized by the device 600. The transceiver(s) may further include a low noise amplifier (LNA), additional signal amplifiers, an analog-to-digital (A/D) converter, one or more buffers, a digital baseband, or the like.

It should be appreciated that the device 600 may include alternate and/or additional hardware, software, or firmware components beyond those described or depicted without departing from the scope of the disclosure. More particularly, it should be appreciated that software, firmware, or hardware components depicted as forming part of the device 600 are merely illustrative and that some components may not be present or additional components may be provided in various embodiments.

Various other changes and modifications to the embodiments herein chosen for purposes of illustration will readily occur to those skilled in the art. For example, certain materials for the purposes of bonding and/or castellated contact formation were described, but other materials may also be effective. Further additional intervening layers may be able to be provided while still benefiting from the explained embodiments. Examples were described to aid in understanding. Thus, it was not intended that these examples were the only examples. To the extent that such modifications and variations do not depart from the spirit of the invention, they are intended to be included within the scope thereof. It will be readily understood to those skilled in the art that various other changes in the details, material, and arrangements of the parts and method stages which have been described and illustrated in order to explain the nature of this disclosure may be made without departing from the principles and scope of the disclosure.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Additional Embodiments

Figure 7:
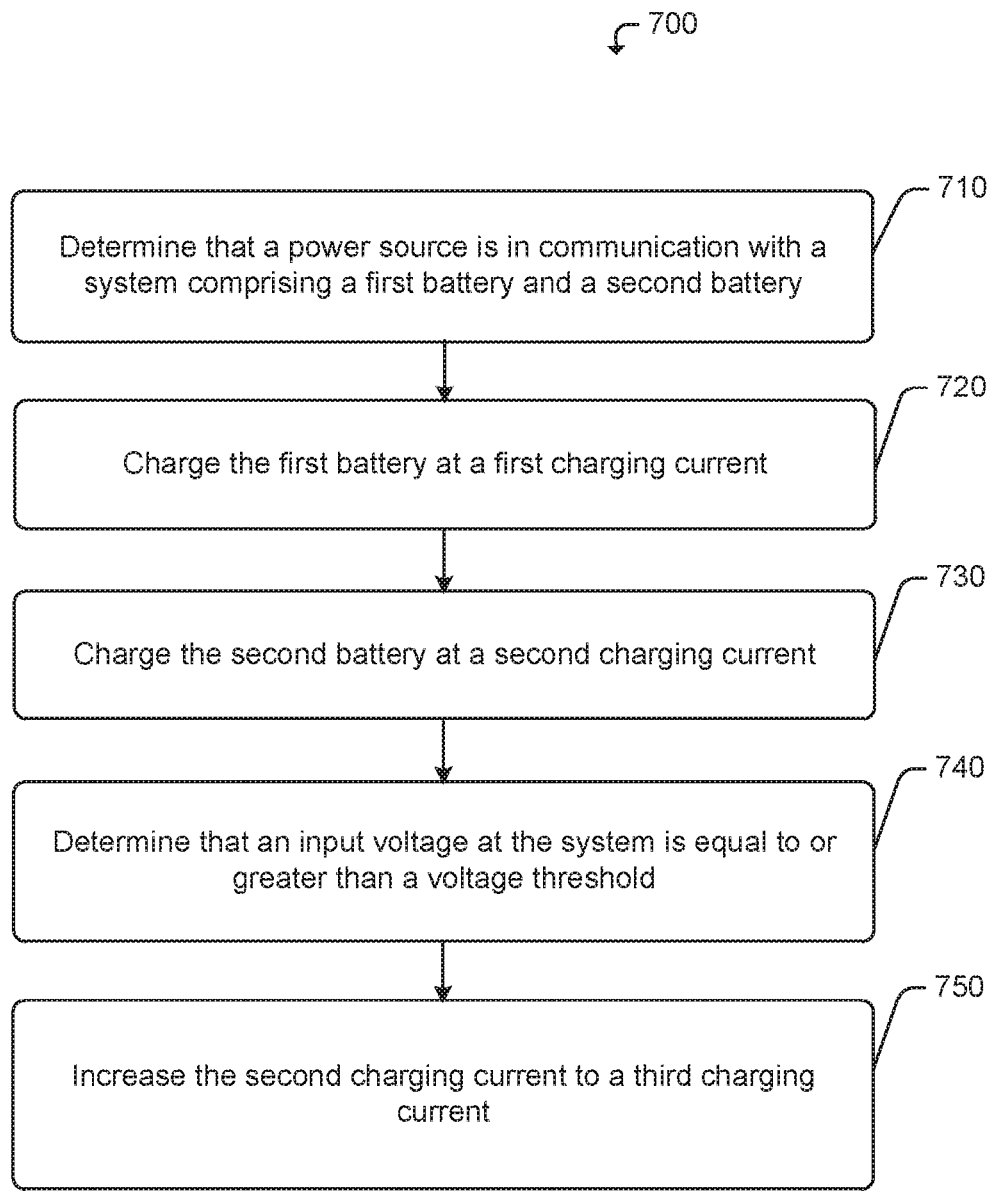
FIG. 7 is a process flow diagram of an illustrative method for dynamic current redistribution in accordance with one or more example embodiments of the disclosure.

Referring to FIG. 7, a process flow 700 for dynamically distributing current is depicted in accordance with one or more embodiments of the disclosure. Block 710 of the process flow 710 includes determining that a power source is in communication with a system that includes a first battery and a second battery. For example, an electronic device may be connected to a power source via a wall adapter and a USB connection. When the USB connection is made (e.g., when the USB is plugged into the electronic device and/or the wall adapter, the electronic device may determine that a power source is in communication with the system. In another example, a system may determine that a power source is in communication with the system when an interruption at a VBUS line is detected. The first battery may be in communication with the power source and the second battery. In some embodiments, the power source may be in direct communication and/or a parallel connection with both the first battery and the second battery.

Block 720 of the process flow 700 includes charging the first battery at a first charging current. For example, the first battery may be charged at a first maximum charging load, which may be the maximum input current the first battery can safely receive. In another example, the first charging current may be a portion of the available current.

Block 730 includes charging the second battery at a second charging current. The second charging current may be the same or different than the first charging current. The second charging current may be a second maximum charging load representing a maximum input current the second battery can safely receive.

Block 740 includes determining that an input voltage at the system is equal to or greater than a voltage threshold. A voltage threshold may be determined by the system or may be predetermined. For example, a voltage threshold may be 4.75 volts. The voltage threshold may indicate a minimum input voltage that is supplied to the system from the power source. The input voltage that is supplied to the system may be measured or determined by a PMIC or ADC. If an input voltage is equal to or less than the voltage threshold, the output voltage of the charging device may be at risk of collapsing. A voltage collapse may indicate that the current drawn from the charging device was too high, and as a result, the output voltage from the charging device dropped to about 0 volts (<2 volts per BC 1.2 specification). In the event of a voltage collapse, the charging process may restart as if the charging device was removed from the power source and then plugged back into the power source, resulting in wasted time and increased charging time for the device and/or external battery. The voltage threshold may be set so as to extract maximum current from the charging device just before the voltage collapses, thereby utilizing the maximum current the charging device can provide before the voltage collapses and/or the charging process restarts.

Block 750 of the process flow includes increasing the second charging current to a third charging current. After determining that the input voltage is equal to or greater than the voltage threshold at block 740, the system may determine that the charging device can provide additional current, and may therefore increase the first charging current and/or the second charging current until the respective maximum current loads are reached. At the maximum current load, charging time for a respective battery is minimized.

Figure 8:
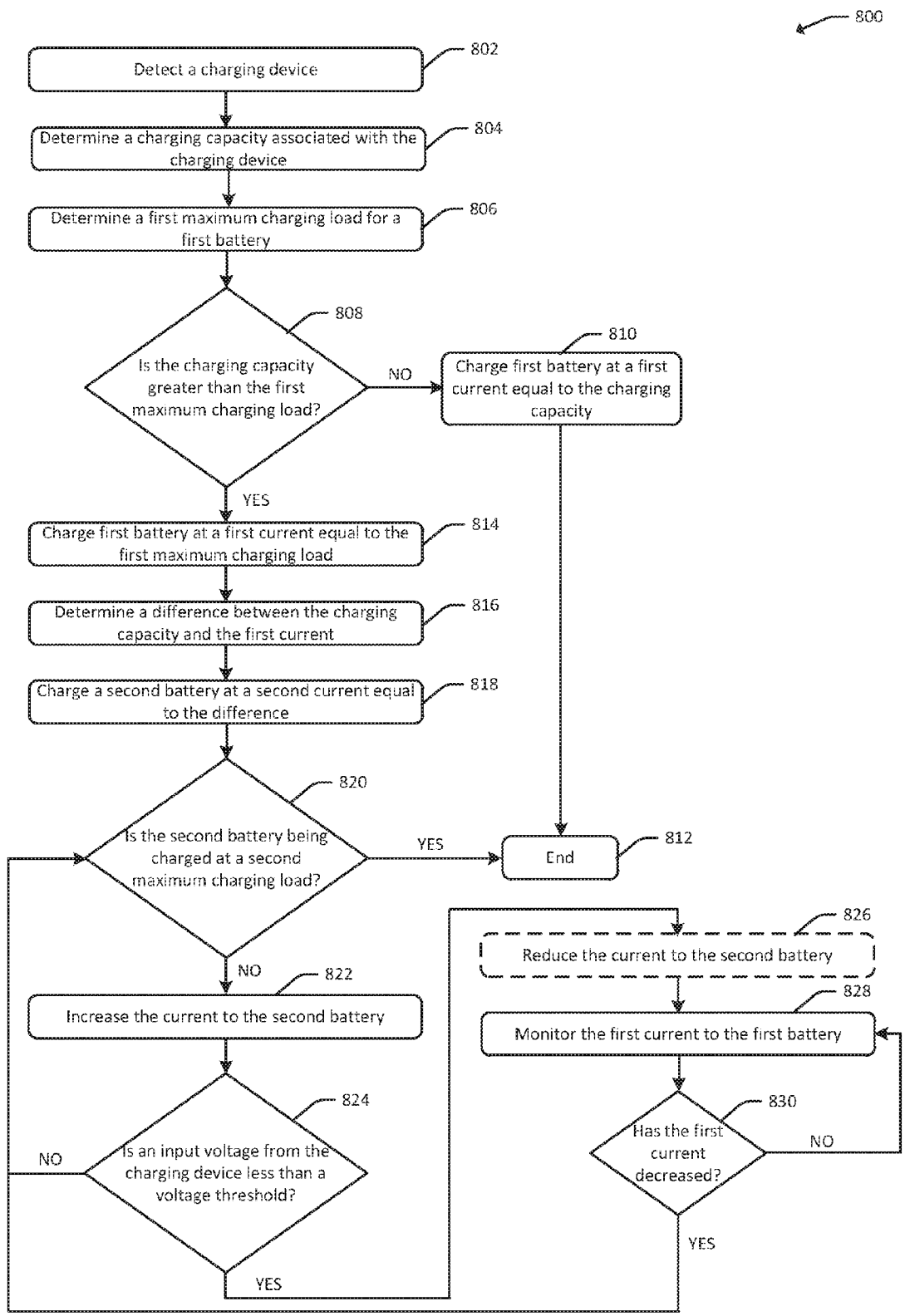
FIG. 8 is a process flow diagram of an illustrative method for minimizing charging time in accordance with one or more example embodiments of the disclosure.

Referring to FIG. 8, a process flow 800 for minimizing charging time in accordance with one or more embodiments of the disclosure is illustrated. At block 802, a charging device is detected. The charging device may be detected, for example, when the charging device is connected to a system. In some embodiments, the charging device may be connected via a USB interface.

At block 804, a charging capacity associated with the charging device is determined. Charging capacity may be a rated maximum current or another indication of current that a charging device can provide. In some embodiments, charging devices may be able to provide more current than a rated maximum current or an indicated maximum current. In some embodiments, the charging capacity may be very coarsely determined via Data + and/or Data – wires of a charging cable (e.g., BC 1.2 compliant charging devices, which may be categorized into three categories of 100 mA, 500 mA, or >500 mA). The charging capacity may be determined by a PMIC of the system. In other embodiments, however, non-standard or non-compliant charging devices may not indicate an available maximum charging capacity. In such instances, a default charging capacity, such as 500 milliamps, may be determined for the charging device.

At block 806, a first maximum charging load for a first battery is determined. The first maximum charging load may be a maximum input current the first battery can receive. At the first maximum charging load, a charging time for the first battery may be minimized.

At determination block 808, a determination is made as to whether the charging capacity is greater than the first maximum charging load. If it is determined that the charging capacity is not greater than the first maximum charging load, the process flow 800 proceeds to block 810, at which the first battery is charged at a first current equal to the charging capacity. Accordingly, the first battery is charged at the maximum current the charging device can provide, and charging time for the first battery by the charging device is minimized. The process flow 800 then ends at block 812.

If it is determined that the charging capacity is greater than the first maximum charging load at determination block 808, the process flow 800 continues to block 814, at which the first battery is charged at a first current equal to the first maximum charging load. Charging time for the first battery is therefore minimized, as the first battery is receiving current at its maximum load.

The process flow may continue to block 816, at which a difference between the charging capacity and the first current is determined. For example, the charging device may have a rated maximum current or charging capacity of 1.5 Amps, and the first current may be 0.5 Amp. The difference between the charging capacity and the first current may be 1.5−1=1.0 Amp. In some embodiments, a determination may be made as to whether the difference between the charging capacity and the first current is greater than 0 amps, which may indicate additional charging capacity is available.

At block 818, the process flow 800 may include charging a second battery at a second current equal to the difference, or the remaining available current. For example, a second battery may receive all available current after the first battery is charged at its maximum current load. The first battery may be an internal battery of a device or an external battery. In some embodiments, a second maximum charging load of the second battery may be determined before charging the second battery at the difference or the remaining available current. If the second maximum charging load is less than the available current, the second battery may be charged at its maximum charging load rather than at the available current. If the second maximum charging load is greater than the difference, the second battery may be charged at the available current. For example, if the second maximum charging load is 1.25 Amps and the difference is 1.0 Amp, the second battery may be charged at a second current of 1.0 Amp.

In some embodiments, a determination may be made as to battery prioritization. For example, if the first battery is prioritized over the second battery, the first battery may be charged at the first maximum charging load before the second battery is charged at all. If the second battery is prioritized over the first battery, the second battery may be charged at the second maximum charging load before the first battery is charged. In some embodiments, battery prioritization may be dynamic, in that a battery with less charge than the other will be prioritized, or a battery with less than a certain amount of charge will be prioritized (e.g., a battery below 50% charge may be given priority). Battery prioritization may be set or selected by a user in some embodiments.

At determination block 820, a determination is made as to whether the second battery is being charged at the second maximum charging load. If it is determined that the second battery is being charged at the second maximum charging load, the charging time for the second battery is minimized, and the process flow 800 may end at block 812.

If it is determined that the second battery is not being charged at the second maximum charging load at determination block 820, the process flow 800 may proceed to block 822, at which the current to the second battery is increased. For example, the second current may be increased by a predetermined amount, such as 100 milliamps, to a third current of 1.1 Amps. The predetermined amount may be any suitable increment and/or may be a percentage of the second maximum charging load in some embodiments.

After the current to the second battery is increased, at determination block 824 a determination is made as to whether an input voltage from the charging device is less than a voltage threshold. If it is determined that the input voltage is not less than the voltage threshold, the process flow 800 may return to determination block 820 to determine whether the second battery is being charged at the second maximum charging load. The iterative process may continue until the second battery is being charged at the second maximum charging load and/or it is determined at determination block 824 that the input voltage is less than the voltage threshold.

If it is determined that the input voltage from the charging device is less than the voltage threshold at determination block 824, the process flow 800 may continue to optional block 826. At block 826, the current to the second battery may optionally be reduced by a backoff amount. The backoff amount may be a predetermined amount and may be less than the amount by which the current to the second battery is increased at block 822. By reducing the current to the second battery at block 826, a risk of voltage collapse may be reduced.

In the event the input voltage collapses, for example, if the backoff amount is insufficient, the input voltage may drop to about 0 volts (<2 volts per BC 1.2 specification). The process flow 800 may return to block 802 and the process may start over, or may start with the first current value and the last known second current value before the voltage collapsed.

At block 828, the first current to the first battery may be monitored. For example, the first current may be monitored using a PMIC or ADC of a user device. The first current may change due to, for example, the first battery completing a charge cycle, reaching a threshold level of charge (e.g., 80%, 90%, etc.), a slack in the charging of the first battery, and the like.

At determination block 830, a determination may be made as to whether the first current has decreased. For example, if the first battery has completed charging, the first current may decrease to 0 Amp. If it is determined that the first current has not decreased, the process flow 800 may return to block 828 and may continue monitoring the first current. In some embodiments, the first current may be continuously monitored, while in other embodiments, the first current may be monitored periodically, such as every 10 seconds or every 15 seconds.

If it is determined that the first current has decreased at determination block 830, the process flow 800 may return to determination block 820, at which it is determined whether the second battery is being charged at the second maximum charging load. If the second battery is not being charged at the second maximum charging load, the current supplied to the second battery may be increased since the first current has decreased, and additional current is therefore available. In some embodiments, the current supplied to the second battery may automatically be increased by the same amount the first current is decreased, as long as the second maximum charging load is greater than or equal to the increased current to the second battery. Accordingly, the process flow 800 may reduce charging time for the first battery and/or the second battery by extracting as much current as possible from the charging device and/or by charging the first battery and the second battery at the respective maximum charging loads.

Figure 9:
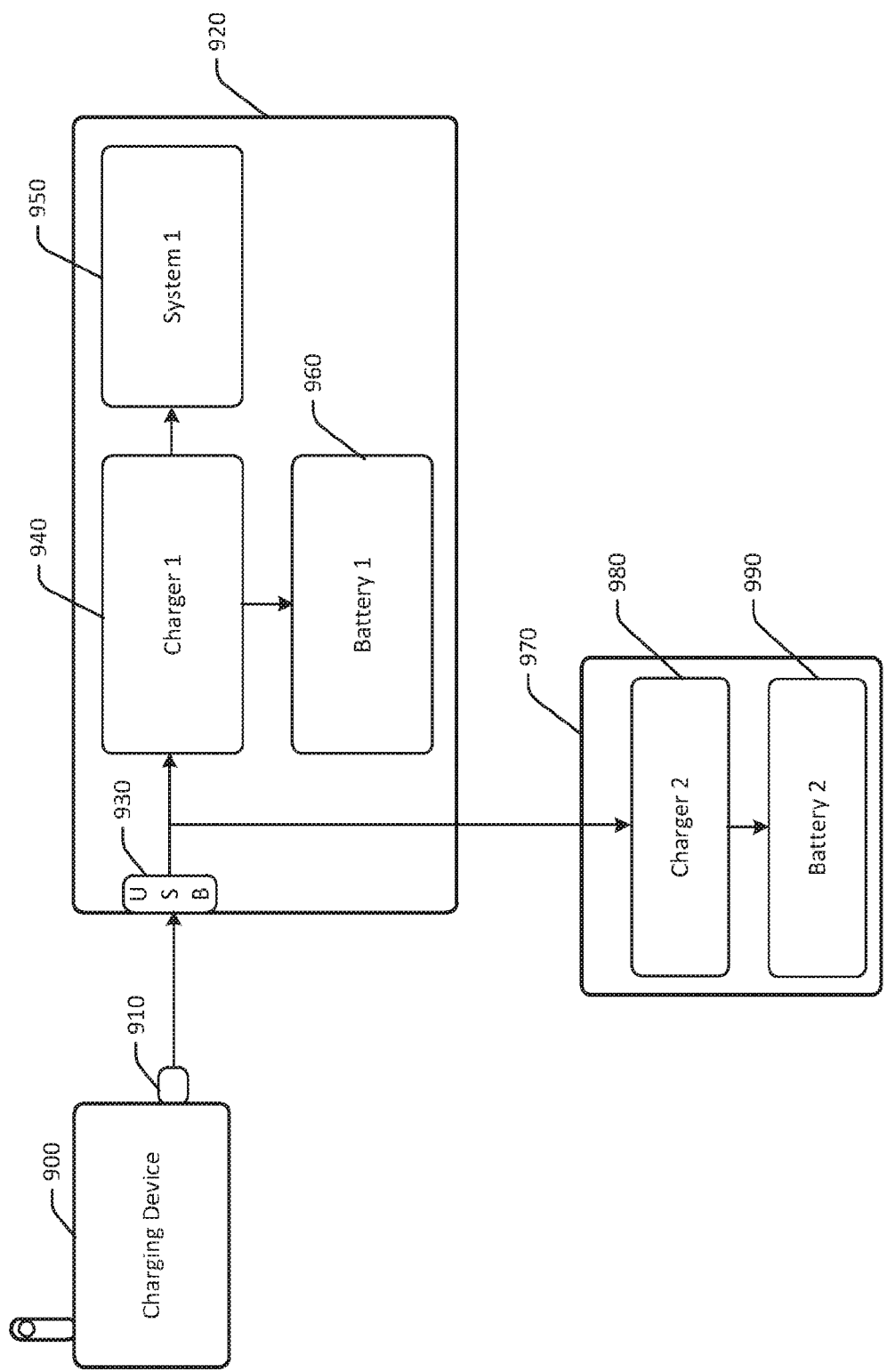
FIG. 9 is a schematic block diagram of an illustrative current redistribution system in accordance with one or more example embodiments of the disclosure.

FIG. 9 depicts an example charging system in accordance with one or more embodiments of the disclosure. The charging system may include a charging device 900, a user device 920, and an external battery 970. The charging device 900 may be a wall adapter, a charging adapter, or another charging device. The charging device 900 may be coupled to and/or in electrical communication with the user device 920. For example, the charging device 900 may include a first USB port 910 configured to receive a USB plug. The first USB port 910 may be a standard downstream port, a dedicated charging port, or a charging downstream port.

The user device 920 may include a second USB port 930. The second USB port 930 may be configured to receive a USB plug. The charging device 900 may be in communication with the user device 920 via the first USB port 910 and the second USB port 930. Other connection devices may be used.

The user device 920 may include a first charger 940 that is in electrical communication with a first battery 960. The first charger 940 may be in electrical communication with a system 950. The first charger 940 may supply or direct current and/or power to the system 950 and the first battery 960. The first charger 940 may detect the charging device 900 when an electrical connection is established between the user device 920 and the charging device 900. The first charger 940 may determine a rated maximum of the charging device 900. In some embodiments, the charging device 900 may be non-compliant with an industry specification, such as BC 1.2, and the first charger 940 may determine that the charging device 900 is non-compliant. The first charger 940 may assign an initial maximum current to non-compliant charging devices.

The external battery 970 may include a second charger 980 in electrical communication with a second battery 990.

The external battery 970 may be in electrical communication with the user device 920. In some embodiments, the external battery 970 may be in a series connection to the charging device 900 with the user device 920, while in other embodiments, the user device 920 and the external battery 970 may be connected to the charging device 900 in parallel. The external battery 970 may be configured to receive current from the charging device 900. The second charger 980 may manage current supplied to the second battery 990.

The first charger 940 and the second charger 980 may be used to manage charging of the first battery 960 and the second battery 990, respectively. In some embodiments, the user device 920 may manage charging of both the first battery 960 and the second battery 990.

Figure 10:
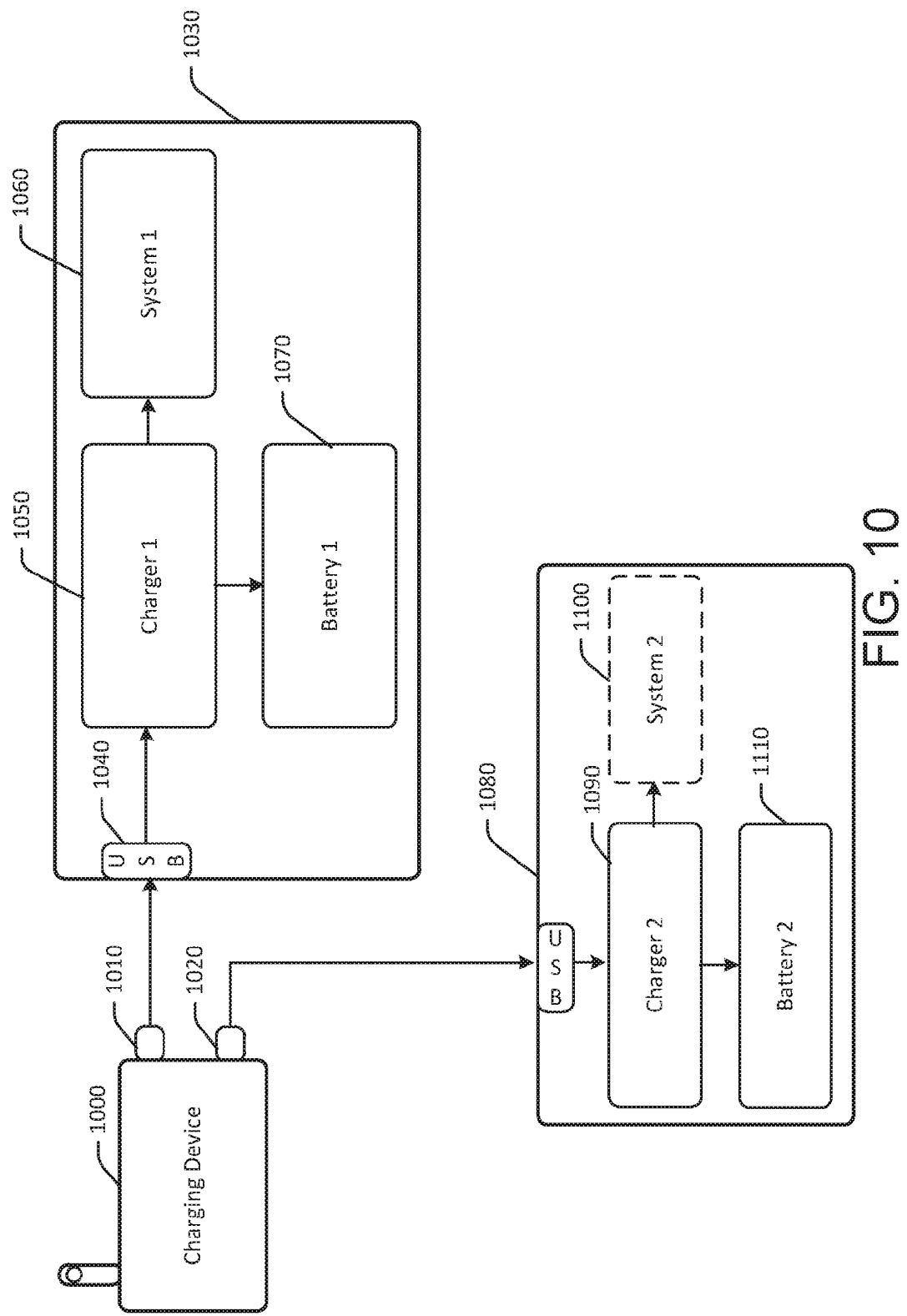
FIG. 10 is a schematic block diagram of an illustrative current redistribution system in accordance with one or more example embodiments of the disclosure.

Referring to FIG. 10, another embodiment of an example charging system in accordance with one or more embodiments of the disclosure is depicted. The charging system may include a charging device 1000 with a first charging port 1010 and a second charging port 1020. The first charging port 1010 and the second charging port 1020 may be connected in parallel or in series to a power source, such as a wall outlet. The first charging port 1010 and/or the second charging port 1020 may be a standard downstream port, a dedicated charging port, or a charging downstream port. A user device 1030 may be in electrical communication with the first charging port 1010 via a USB port 1040. An external battery 1080 may be in electrical communication with the second charging port 1020. In some embodiments the external battery 1080 may actually be a second user device with a second system 1100.

The user device 1030 may include a first charger 1050 that is in electrical communication with a first battery 1070. The first charger 1050 may be in electrical communication with a first system 1060. The first charger 1030 may supply or direct current and/or power to the first system 1060 and the first battery 1070. The first charger 1050 may detect the charging device 1000 when an electrical connection is established between the user device 1030 and the charging device 1000. The first charger 1050 may determine a rated maximum of the charging device 1000. In some embodiments, the charging device 1000 may be non-compliant with an industry specification, such as BC 1.2, and the first charger 1050 may determine that the charging device 1000 is non-compliant. The first charger 1050 may assign an initial maximum current to non-compliant charging devices.

The external battery 1080 may include a second charger 1090 in electrical communication with a second battery 1110. The external battery 1080 may be in direct electrical communication with the charging device 1000 and parallel with the user device 1030. The external battery 1080 may be configured to receive current from the charging device 1000. The second charger 1090 may manage current supplied to the second battery 1110.

The first charger 1050 and the second charger 1090 may be used to manage charging of the first battery 1070 and the second battery 1110, respectively. In some embodiments, the charging device 1000 may manage charging of both the first battery 1070 and the second battery 1110.

Certain embodiments of the disclosure may determine a charging priority of two or more batteries and simultaneous charge the two or more batteries so as to minimize charging time. Embodiments of the disclosure may extract maximum power from arbitrary wall charger adapters and minimize system charging time.

What is claimed is:

1. A method comprising:
   determining, by a user device, that a charging adapter is connected to the user device, the user device comprising a first battery and a power management integrated circuit;
   determining, by the user device using a power management integrated circuit, that the charging adapter has a rated maximum output current value;
   determining that the rated maximum current value is greater than a first maximum charging load value of the first battery;
   charging the first battery at the first maximum charging load value with a first charging current;
   determining that a second battery is connected to the user device, the second battery having a second maximum charging load value that is greater than the first maximum charging load value;
   determining a second charging current value that is a difference between the rated maximum current value and the first maximum charging load value;
   charging the second battery at the second charging current value with a second charging current;
   determining that the second charging current value is less than the second maximum charging load value;
   increasing the second charging current to a third charging current value, wherein the third charging current value is less than the second maximum charging load value;
   determining, by the user device using the power management integrated circuit, that an input voltage at the user device is equal to or greater than 4.75 volts;
   increasing the second charging current to a fourth charging current value, wherein the fourth charging current value is less than the second maximum charging load value;
   determining that the input voltage is less than 4.75 volts; and
   reducing the second charging current to a fifth charging current value.

2. The method of claim 1, further comprising:
   monitoring, by the user device using the power management integrated circuit, the first charging current at a periodic time interval;
   determining that the first charging current has decreased at a first time interval;
   determining that the fifth charging current value is less than the second maximum charging load value;
   increasing the second charging current to a sixth charging current value, wherein the sixth charging current value is equal to the second maximum charging load value; and
   determining, by the user device using the power management integrated circuit, that the input voltage is equal to or greater than 4.75 volts.

3. The method of claim 1, further comprising:
   determining, by the user device using the power management integrated circuit, that the input voltage is about 0 volts;
   determining that the charging adapter is connected to the user device;
   charging the first battery at the first maximum charging load value;
   charging the second battery at a sixth charging current value; and
   determining that the input voltage is equal to or greater than 4.75 volts.

4. The method of claim 1, further comprising:
   determining that the first battery has reached a maximum capacity;
   determining that the fifth charging current value is less than the second maximum charging load value; and
   increasing the second charging current to the second maximum charging load value.

5. A system comprising:
   a first battery;
   a second battery;
   at least one memory that stores computer-executable instructions; and
   at least one processor configured to access the at least one memory and execute the computer-executable instructions to:
   determine that a power source is in communication with the system, wherein the power source is configured to provide a rated maximum current value to the system;
   determine that the rated maximum current value is greater than a first maximum charging load value of the first battery;
   charge the first battery at a first charging current value;
   charge the second battery at a second charging current value;
   determine that an input voltage at the system from the power source is equal to or greater than a voltage threshold;
   charge the second battery at a third charging current value higher than the second charging current value, wherein a sum of the first charging current value and the third charging current value is equal to or less than the rated maximum current value.

6. The system of claim 5, wherein the at least one processor is further configured to execute the computer-executable instructions to:
   determine that the first charging current value is equal to a first maximum charging load value of the first battery;
   determine that the third charging current value is less than a second maximum charging load value of the second battery;
   determine that the input voltage is equal to or greater than the voltage threshold; and
   charge the second battery at a fifth charging current value that is higher than the third charging current value.

7. The system of claim 6, wherein the at least one processor is configured to charge the second battery at the fifth charging current value by increasing the third charging current value by a first predetermined amount, and the at least one processor is configured to charge the second battery at the fourth charging current by reducing the third charging current value by a second predetermined amount, wherein the second predetermined amount is less than the first predetermined amount.

8. The system of claim 5, wherein the at least one processor is further configured to execute the computer-executable instructions to:
   determine that the input voltage is less than the voltage threshold;
   determine that the first charging current has decreased;
   determine that the third charging current value is less than a second maximum charging load of the second battery; and
   charge the second battery at a fifth charging current value that is higher than the third charging current value.

9. The system of claim 5, wherein the at least one processor is further configured to execute the computer-executable instructions to:

determine that the first charging current has reduced by a first amount; and charge the second battery at a fifth charging current value by increasing the third charging current value by the first amount.

10. The system of claim 5, wherein the at least one processor is further configured to execute the computer-executable instructions to:

determine a rated maximum current output that the power source can provide;

determine a first maximum charging load value for the first battery, wherein the first charging current value is the first maximum charging load value;

determine a difference between the rated maximum current output and the first maximum charging load value, wherein the second charging current value is equal to the difference; and charge the second battery at the third charging current value by increasing the second charging current value by a predetermined amount.

11. The system of claim 5, wherein the at least one processor is configured to determine that the power source can provide additional current by executing the computer-executable instructions to:

determine a rated maximum current output that the power source can provide; and determine a difference between the rated maximum current output and the first charging current value.

12. The system of claim 5, wherein the at least one processor is further configured to execute the computer-executable instructions to:

determine that the first battery has a first stored energy value that is less than a second stored energy value of the second battery; and determine that the first battery is prioritized for charging over the second battery.

13. A method comprising:

determining, by one or more computer processors coupled to at least one memory, that a power source is in communication with a first battery, wherein the power source is configured to provide a rated maximum current value to the system;

determining that the rated maximum current value is greater than a first maximum charging load value of the first battery;

determining that a second battery is in communication with the first battery;

charging the first battery at a first charging current value;

charging the second battery at a second charging current value;

determining that an input voltage from the power source is equal to or greater than a voltage threshold;

charging the second battery at a third charging current value that is higher than the second charging current value, wherein a sum of the first charging current value and the third charging current value is equal to or less than the rated maximum current value.

14. The method of claim 13, further comprising:

determining that the first charging current value is equal to a first maximum charging load value of the first battery;

determining that the third charging current value is less than a second maximum charging load value of the second battery;

determining that the input voltage is equal to or greater than the voltage threshold; and charging the second battery at a fifth charging current value that is higher than the third charging current value.

15. The method of claim 14, wherein charging the second battery at the fourth charging current value comprises increasing the third charging current value by a first predetermined amount; and wherein charging the second battery at the fourth charging current value comprises reducing the fourth charging current by a second predetermined amount that is different than the first predetermined amount.

16. The method of claim 13, further comprising:

determining that the input voltage is less than the voltage threshold;

determining that the first charging current has decreased;

determining that the third charging current value is less than a second maximum charging load value of the second battery; and charging the second battery at a fifth charging current value that is higher than the third charging current value.

17. The method of claim 13, further comprising:

monitoring a current supplied to the first battery at predetermined time intervals; and determining that the first charging current value has decreased by a first amount;

wherein charging the second battery at the fifth charging current value comprises increasing the third charging current value by the first amount.

18. The method of claim 13, further comprising:

determining that the first charging current value has reduced by a first amount; and charging the second battery at a fifth charging current value by increasing the third charging current value by the first amount.

19. The method of claim 13, further comprising:

determining a rated maximum current output that the power source can provide;

determining a first maximum charging load value for the first battery, wherein the first charging current charges the first battery at the first maximum charging load value;

determining a difference between the rated maximum current output and the first maximum charging load value, wherein the second charging current value is equal to the difference; and charging the second battery at the third charging current value by increasing the second charging current value by a predetermined amount.

20. The method of claim 13, further comprising:

determining that the first battery has a first stored energy value that is less than a second stored energy value of the second battery; and determining that the first battery is prioritized for charging over the second battery.

* * * * *